United States Patent [19]

Arimatsu et al.

[11] 4,370,283
[45] Jan. 25, 1983

[54] PROCESS FOR VULCANIZATION OF ELASTOMER PRODUCTS

[75] Inventors: Toshio Arimatsu, Akashi; Tohatirou Sakon, Kobe, both of Japan

[73] Assignee: Sumitomo Rubber Industries, Ltd., Hyogo, Japan

[21] Appl. No.: 311,955

[22] Filed: Oct. 16, 1981

[30] Foreign Application Priority Data

Oct. 27, 1980 [JP] Japan .................. 55-151171

[51] Int. Cl.³ .............................. B29H 5/02
[52] U.S. Cl. ...................... 264/37; 264/85; 264/315; 264/326; 425/29; 425/33; 425/58
[58] Field of Search .......... 425/17, 19, 20, 21, 425/22, 23, 24, 25, 26, 29, 30, 33, 35, 39, 40, 58; 264/37, 85, 315, 326

[56] References Cited

U.S. PATENT DOCUMENTS

| | | | |
|---|---|---|---|
| 1,200,603 | 10/1916 | Gammeter | 425/29 |
| 3,443,280 | 5/1969 | Hagger | 425/43 X |
| 4,097,565 | 6/1978 | Cole et al. | 425/30 X |
| 4,126,657 | 11/1978 | Gado | 425/29 X |

Primary Examiner—J. Howard Flint, Jr.
Attorney, Agent, or Firm—Birch, Stewart, Kolasch & Birch

[57] ABSTRACT

An improved process for vulcanization of elastomer products which includes the steps of heating under pressure, the elastomer product mounted in a metal mold by supplying vulcanizing medium, suspending the supply of the vulcanizing medium when the elastomer product has reached a predetermined temperature or passed through a predetermined time period, subsequently supplying inert gas preliminarily extracted from atmospheric air and maintained at least under approximately the same pressure as that of the vulcanizing medium, up to the termination of the heating step so as to maintain the elastomer product at the predetermined temperature, and, upon termination of said heating step, restoring a mixture of the inert gas and the vulcanizing medium so as to derive the inert gas through steam separation for re-utilization of the inert gas for a pre-shaping of the elastomer product prior to the vulcanization of the elastomer product and the like.

6 Claims, 2 Drawing Figures

PROCESS FOR VULCANIZATION OF ELASTOMER PRODUCTS

BACKGROUND OF THE INVENTION

The present invention generally relates to a process for vulcanization of elastomer products made, for example, of synthetic rubber, elastomeric plastics, etc., and more particularly, to an improved process for vulcanization of elastomer products, especially pneumatic tires and the like.

Conventionally, in the vulcanization of pneumatic tires for motor vehicles, etc., there have generally been adopted a steam vulcanizing system which employs steam as a heating medium, and a hot water vulcanizing system which employs hot water as a heating medium. In any of the above systems, application of predetermined degrees of temperature and pressure is essential, but, while the supply of pressure is indispensable up to the termination of the heating process, continuous supply of heat amount is not substantially required by providing a sufficient heat insulation or by replenishing heat amount equivalent to the heat amount radiated, if a proper amount of heat is supplied at the initial stage of the heating process to attain the standard temperature necessary for the vulcanization.

However, in the known steam vulcanizing system as described above, partly due to the employment of saturated steam, it is necessary to continuously supply the steam at predetermined degrees of temperature and pressure up to the termination of the heating process, even after the tire to be processed has reached the standard temperature whereat the supply of heat is not required so much. Meanwhile, in the hot water vulcanizing system referred to above, since the temperature and pressure are independently changeable, even if the pressure has to be continuously supplied up to the completion of the heating step, supply of heat amount for maintaining the temperature is assumed to become unnecessary, after the tire to be processed has attained the standard temperature. However, owing to a large specific heat of water, when the temperature of hot water is lowered upon suspension of the supply of heat, the temperature of the tire is also undesirably lowered due to absorption of the heat amount by water, and thus, it is required, after all, to continuously supply hot water at predetermined degrees of temperature and pressure up to the termination of the heating process. Since the known processes as described above are of course very wasteful from the viewpoint of savings of resources, there has recently been attempted to employ a combination of steam or hot water and gas in the heating process for vulcanization of tires. The gas referred to above, however, is one produced by the so-called burning furnace system in which exhaust gas (mainly composed of nitrogen) obtained by subjecting raw gas to complete combustion in a burning furnace, is cooled down close to room temperature and pressurized by a compressor, through employment of propane gas, butane gas, city gas, etc. associated with petroleum as the raw gas. Therefore, not only the energy cost is high, thus going against the requirements for savings of resources, but control of ratio of air for burning is not easy due to unsteady fuel gas compositions, while construction of an arrangement therefore with a small burden is difficult owing to the presence of carbonic acid, nitric acid, etc. brought about by impurities such as carbon dioxides, nitrogen oxides, etc., and thus, for example, effective utilization of the used inactive or inert gas discharged is not readily effected, with a consequent high installation cost, while there is a possibility that toxic gases such as carbon monoxide, and nitrogen oxides which may give rise to public pollution, may be developed.

SUMMARY OF THE INVENTION

Accordingly, an essential object of the present invention is to provide an improved process for vulcanization of elastomer products based on the so-called resource saving system, which is highly efficient and easily controllable at high reliability and can be readily introduced into production lines at low energy cost.

Another important object of the present invention is to provide an improved process for vulcanization of elastomers as described above which is capable of further improving the resource saving effect through effective utilization of discharged inert gas, with simultaneous improvement of qualities of the resultant vulcanized elastomer products.

In accomplishing these and other objects, according to one preferred embodiment of the present invention, there is provided a process for vulcanization of elastomer products which includes the steps of heating under pressure, the elastomer product mounted in a metal mold by supplying thereto vulcanizing medium, suspending the supply of the vulcanizing medium when the elastomer product has reached a predetermined temperature or passed through a predetermined time period, subsequently supplying inert gas preliminarily extracted from atmospheric air with use of molecular sieves, and maintained at least under approximately the same pressure as that of the vulcanizing medium as a heat retaining medium, up to the termination of remaining time period for the heating step so as to maintain the elastomer product at the predetermined temperature, and, upon termination of said heating step, restoring a mixture of the inert gas and the vulcanizing medium so as to derive the inert gas through steam separation for re-utilization of said inert gas for a preshaping of the elastomer product prior to the vulcanization of said elastomer product and the like.

By the procedures as described above, an improved process for vulcanization of elastomer products has been advantageously presented, with substantial elimination of disadvantages inherent in the conventional processes of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
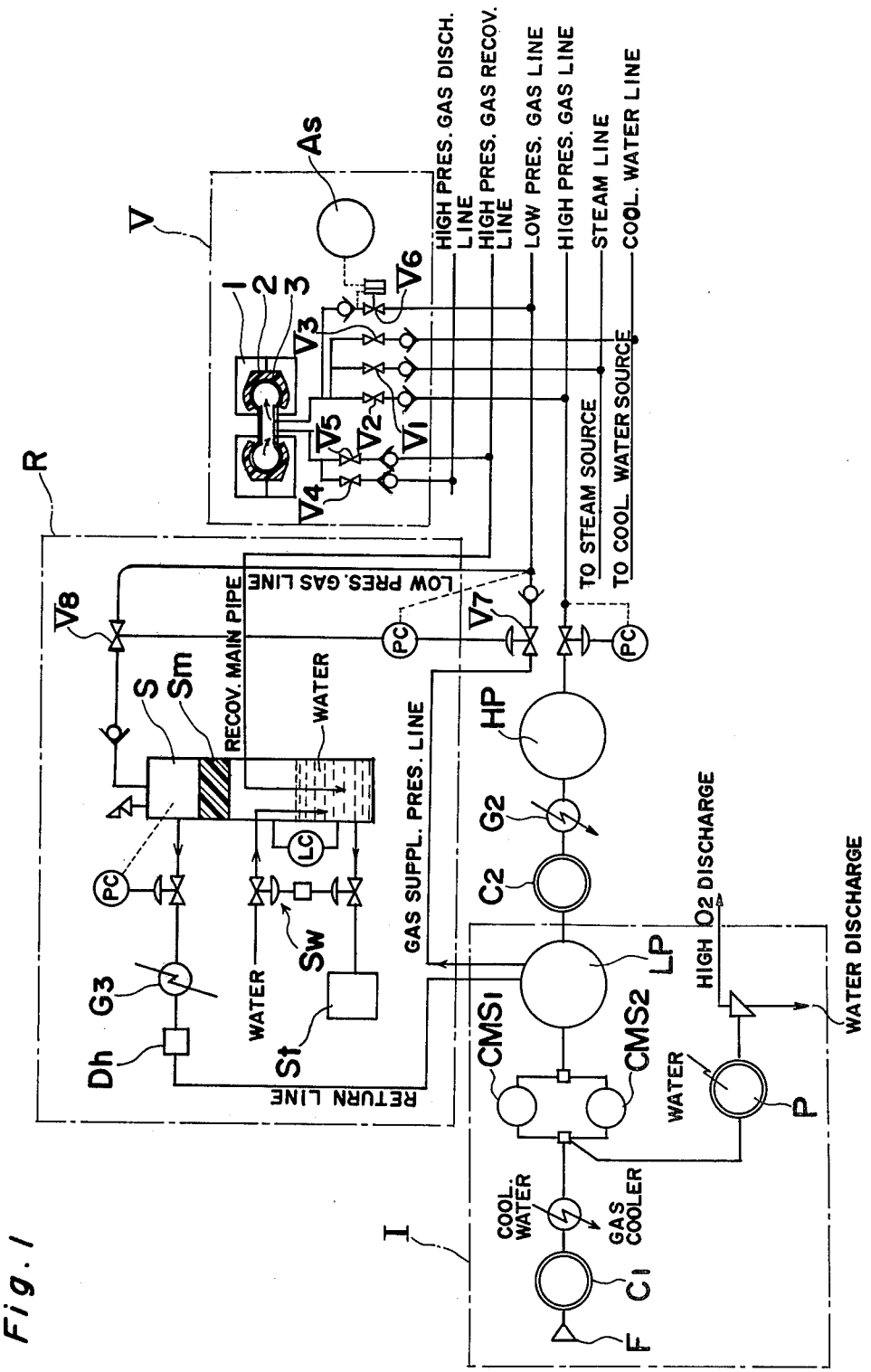
FIG. 1 is a block diagram explaining the flow of a process for vulcanization of elastomer products according to one preferred embodiment of the present invention.

According to one preferred embodiment of the present invention as illustrated in FIG. 1, the process for vulcanization of elastomer products includes the steps of supplying vulcanizing medium into the elastomer product mounted in a metal mold through an expandable bag-like member (i.e. a bladder) or directly without passing through such bag-like member, suspending supply of said vulcanizing medium when the elastomer product has reached a predetermined temperature or passed through a predetermined time period, subsequently supplying, as a heat retaining medium, inert gas preliminarily extracted from atmospheric air through employment of molecular sieves and maintained at least under approximately the same pressure as that of said vulcanizing medium, up to termination of the remaining time period of the heating step so as to maintain the elastomer product at said predetermined temperature and, upon termination of said heating step, restoring a mixture of the inert gas and the vulcanizing medium so as to derive the inert gas through steam separation for re-utilization of the inert gas for a preshaping of the elastomer product prior to the vulcanization of the elastomer product and the like.

It is to be noted here that the elastomer products include, for example, pneumatic tires, vulcanizable molded items, etc., and the vulcanizing medium means hot water, steam, cooling water, and the like, while the expandable bag-like member indicates, for example, a curing bag or bladder employed in the vulcanization of pneumatic tires, which curing bag or bladder is disposed between the vulcanizing medium and the elastomer product in the case where there is a possibility that the life of the elastomer product is adversely affected due to deterioration on the surface thereof through direct contact of the elastomer product with the heating medium, especially steam or the like.

For the production of the inactive gas or inert gas, an inert gas generating unit utilizing molecular sieves and having the basic construction as follows is employed.

As shown in FIG. 1, in the inert gas generating unit I, atmospheric air drawn in through a suction filter F is compressed by a compressor C1 coupled therewith, to have a pressure, for example, at approximately 3 $kg/cm^2G$, and after being cooled and dehumidified by a subsequent gas cooler G1 down to normal temperature, is led to the lower portions of adsorption tanks CMS1 and CMS2 provided in an adsorption process and filled therein with molecular sieves, for example, carbon molecular sieves, which are particularly preferable owing to the superior adsorbing capacity thereof, especially from the aspects of their capability for reducing residual oxygen and highly economical nature, etc. The adsorption tanks CMS1 and CMS2 provided in a pair are arranged to be alternately changed over for use every one minute, one for the adsorption and the other for desorption, through a pressure switching system (not particularly shown). The molecular sieves in the other adsorption tank for the desorption process are subjected to desorption for regeneration through suction for pressure reduction, for example, down to pressure of 60 to 100 mmHg by a water seal vacuum pump P. The inert gas mainly containing nitrogen discharged from the adsorption tank and having a purity, for example, at oxygen content of less than 1.0%, is stored in a low pressure storage tank LP.

According to the present invention, it is possible to obtain inert gas having a still higher purity through addition of reducing gas, especially hydrogen (which may be obtained by ammonia breakdown, methanol breakdown, electrolysis of water, etc.) to the inert gas obtained by the inert gas generating unit I as described above, with subsequent deoxidation. The low pressure inert gas obtained by the generating unit I is further compressed by another compressor C2 connected to the low pressure storage tank LP, to have a higher pressure, for example, at 30 $kg/cm^2G$ and stored for subsequent use, in a high pressure storage tank HP which is coupled to the compressor C2 through a gas cooler G2 and also to a high pressure gas line through a valve with a pressure controller.

The pressure of the inert gas may be arranged to be approximately the same as the pressure of the vulcanizing medium (for example, steam), or to be higher than that of the vulcanizing medium, for example, in such a relation as the inert gas pressure of 18 atmospheric pressure with respect to the vulcanizing medium pressure of 15 atmospheric pressure.

Referring particularly to FIG. 1, the process for vulcanization of elastomer products according to one preferred embodiment of the present invention will be described step by step hereinbelow.

In FIG. 1, there is shown, at its right side, a vulcanizing unit V which generally includes a metal mold 1 in which a pneumatic tire 2 to be processed is accommodated, and pipe lines respectively leading to a high pressure gas discharge line, a high pressure gas recovery line, a low pressure gas line, the high pressure gas line coupled to the high pressure storage tank HP, a steamline and a cooling water line through corresponding valves V4, V5, V2, V1, V3 and V6, and communicated with a space inside the tire 2, through a curing bag or bladder 3 provided in contact with the inner wall of said tire 2.

More specifically, the process for vulcanization of FIG. 1 further comprises, in addition to the inert gas generating unit I and the vulcanizing unit V described above, an inert gas recovery unit I which includes steam separator S of a pressure vessel construction constituted by a mist separator Sm, a water feeding mechanism Sw, a water lever controller Lc and a hot water tank St, and a return line connecting the low pressure storage tank LP with said steam separator S through a dehumidifier Dh, a cooler G3 and a pressure controller. The pressure gas recovery line is connected to the inner side of the metal mold 1 through the valve V5 provided in a parallel relation with the valve V4 for the high pressure gas discharge line, and is also connected to the steam separator S through a recovery main pipe, while the low pressure gas line is communicated with the inner side of the metal mold 1 through the valve V6 and also, with the steam separator S, and further connected to the low pressure storage tank LP through an automatic control valve V7 and a gas supplementary pressure line, with the valve V7 being further connected to a valve V8 provided in the low pressure gas line through a pressure controller.

The process of FIG. 1 as described above is particularly advantageous in that a still more resource saving effect is achieved through the effective utilization of the discharged inert gas, with improved quality of the vulcanized finished products.

(1) Firstly, with respect to the pneumatic tire 2 (for example, of size 175SR14) accommodated in the metal mold 1, the valve V1 of the steam line is opened and the steam at 18 atmospheric pressure is supplied to the tire 2 through the bladder 3 for five minutes. If a large heat radiation is expected depending on the kinds or sizes of the tires, the standard time required for the vulcanization may be set to be somewhat longer than above.

(2) After passing five minutes (at which time, the tire 2 has reached the standard temperature of, for example, 200° C.) by a process timer (not shown), the valve V1 for the steam line is closed to suspend the supply of steam. (The arrangement may be so modified that, with a sensor (not shown) inserted at a shoulder portion of the tire 2 for temperature measurement by a linearizer and A-D converter (not shown), the supply of steam is suspended when the standard temperature of the computer input has been reached.)

(3) Simultaneously with the closing of the valve V1 of the steam line, the valve V2 for the high pressure gas line is opened, and the inert gas which is preliminarily extracted from the atmospheric air so as to have oxygen concentration of less than 50 ppm and more preferably, of about 5 ppm, under 18 atmospheric pressure at normal temperature, and which is stored in the high pressure storage tank HP as described earlier, is supplied, instead of the steam, to the tire 2 through the bladder 3 as a heat retaining medium. It is to be noted here that, in the case where the bladder 3 is not employed, the oxygen concentration should preferably be less than approximately 1000 ppm, and more preferably less than approximately 50 ppm, or most preferably in the range from 4 to 5 ppm from the viewpoint of prevention of deterioration on the inner surface of the tire 2 itself. It should be noted that, since the inert gas as described above is low in the heat conductivity, with a small specific heat, it functions to limit the heat radiation of the tire 2 to the minimum.

(4) After a lapse of five minutes by the process timer, the valve V2 for the high pressure gas line is closed to suspend the supply of the inert gas, and at this time point, the heating process is substantially terminated.

It is to be noted that, the vulcanizing process subsequent to the cooling process is effected through normal steps, and thereafter, the whole vulcanizing process is completed.

(5) Upon termination of the heating process, the valve V3 for the cooling water line and the valve V5 for the high pressure gas recovery line are opened, simultaneously with the closing of the valve V2 for the high pressure gas line (in this case, the valve V4 for the high pressure gas discharge line is closed), and the cooling water is supplied into the tire 2 through the bladder 3. Following the feeding of the cooling water as described above, the mixture of the inert gas and steam, and the mixture of the inert gas and cooling water enter the high pressure gas recovery line so as to be fed into the steam separator S in the inert gas recovery unit R. In the above case, the mixtures as described above are not all collected, but recovered only for a predetermined period of time, for example, for about one minute before entering the discharge process. It is to be noted that the high pressure gas recovery line is provided for each vulcanizing unit separately from the existing discharge line.

(6) The mixtures as referred to above are subjected to the steam separation by the steam separator S, and inert gas under low pressure (for example, 2-5 kg/cm$^2$G) and at temperatures of about 40° to 120° C. and humidity of 100%, is recovered to be introduced into the low pressure gas line.

(7) Before starting the vulcanization (in this case the green tire 2 is mounted on a lower mold of the metal mold 1, with an upper mold being located at a raised position, although not particularly shown), the valve V6 of the low pressure gas line is opened, and the inert gas pressurized to have a desired green tire shaping pressure (for example, 0.1-3 kg/cm$^2$G) by an operating air signal As preliminarily set as desired, is supplied into the green tire 2 mounted on the lower mold through the bladder 3 for preshaping of said green tire. Since the preshaping by the inert gas as described above is free from the disadvantages in the conventional shapings by the compressed air or saturated steam, such as shortening of the life of bladders, adverse effect to the qualities of tires due to large deviations in the shapes or shaping condition of the tires resulting from undesirable cooling of the bladders, it contributes to the improvements of the bladder life and tire qualities.

(8) The surplus inert gas in the recovery enters the return line, and, through the steps for cooling by the cooler G3 and dehumidification by the dehumidifier Dh, is fed into the low pressure storage tank LP of the inert gas generating unit I. It is to be noted here that the return mechanism as described above is not necessarily required, if the restored inert gas is all consumed for the preshaping at all times.

(9) The low presusre gas line is accompanied by the gas supplementary pressure line, which is connected from the low pressure tank LP of the inert gas generating unit I to said low pressure gas line through the automatic control valve V7, and arranged to supply the low pressure gas to the low pressure gas line by receiving signal from the pressure controller so as to maintain the shaping pressure for the tire at the starting of the preshaping under a desirably stable condition.

It should be noted here that, in the inert gas recovery unit R, hot water obtained by the waste heat of steam as a result of the steam separation may be stored in the hot water storage tank St so as to be suitably re-utilized for boilers, heating, temperature control devices, etc.

It should also be noted that, in the inert gas generating unit I as described in the foregoing, the gas containing oxygen at high concentration taken out from the adsorption tank in the desorption process, may be effectively utilized, for example, for an air-exposure process in the sewage treatment so as to improve the treating efficiency or for supply to boilers for the improvement of thermal efficiency.

As is seen from the foregoing description, according to the present invention, since the inert gas at high purity preliminarily extracted from the atmospheric air through utilization of molecular sieves is employed as the heat retaining medium for part of the heating process of elastomers to replace the conventional vulcanizing medium, and thereafter, the inert gas is restored for utilization thereof for the preshaping prior to vulcanization of elastomer products, various favorable effects as follows have been obtained.

(a) Since the used inert gas is effectively utilized without necessity for employing fuel gas associated with petroleum, energy cost may be saved by approximately 70 to 80% as compared with the conventional vulcanizing processes (for example, a known process employing heated water all through the heating process)

(b) Different from the conventional gas vulcanizing process which utilizes the inert gas produced by the burning furnace system, the process of the present invention has advantages as described below.

(i) Since impurity content in the inert gas is small, the load for the compressor is reduced, while pipings, appliances, etc. employed in the process are free from corrosion.

(ii) Since there is no problem related to fluctuation of the fuel gas composition, production of the inert gas may be readily controlled.

(iii) Owing to the fact that no toxic gas such as carbon monoxide, etc. is contained, the process of the present invention is preferable from the viewpoint of safety and sanitation, (iv) Absence of nitrogen oxides reduces the possibility of public pollution.

(v) The by-product (high concentration $O_2$, hot water) obtained by the inert gas generating unit and recovery unit may be utilized as resources.

(vi) The life of the expandable bag-like member (i.e. bladder) may be prolonged to a large extent as follows.

By the use of an automatic type press (not shown) having a bladder made of butyl rubber, comparative experiments were made for the service life of the bladder against repeated use, i.e. the number of endurable times for use, with respect to the case where tires of 175SR14 size are vulcanized in the conventional process and the case where said tires are vulcanized in the heating process employing steam at 18 atmospheric pressure and inert gas at 10 minute cycle, with the results as follows. (the life of the bladder in the conventional process is set to be 100).

| Oxygen concentration in the inert gas | Bladder life |
| --- | --- |
| 5 ppm | 120–150 |
| 50 ppm | 110–120 |
| 1% | 20–50 |
| 0.1% | 80–90 |

Figure 2:
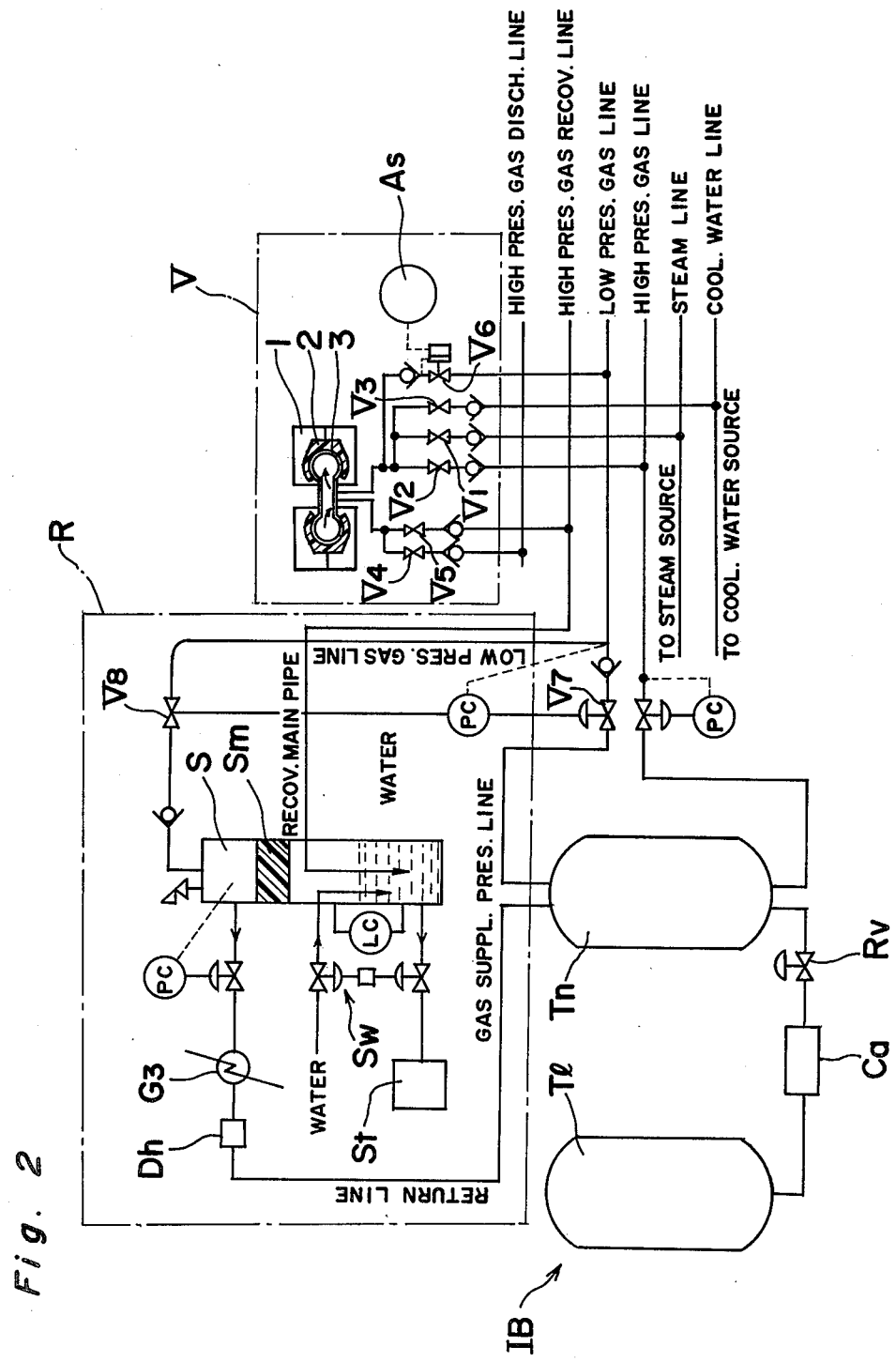
FIG. 2 is a diagram similar to FIG. 1, which particularly shows a modification thereof.

Referring to FIG. 2, there is shown a modification of the arrangement of FIG. 1. In this modification, the inert gas generating unit I, compressor C2, gas cooler G2, and high pressure storage tank HP described as employed in the embodiment of FIG. 1 are replaced by a nitrogen gas generating unit IB including a liquid $N_2$ storage tank Tl coupled, through a carburetor Ca and a pressure reduction valve Rv, to a nitrogen receiver tank Tn which is further connected to the high pressure gas like via the valve associated with the pressure controller and also to the gas supplementary pressure line as shown. In the arrangement of FIG. 2, liquid nitrogen contained in the liquid $N_2$ storage tank Tl is formed, through the carburetor Ca and pressure reduction valve Rv, into nitrogen gas, which is utilized for the same purpose as in the inert gas in the embodiment of FIG. 1 through the change-over valves in the similar manner as in the arrangement of FIG. 1. In the above case, nitrogen at high purity at 0.999 may be obtained.

Although the present invention has been fully described by way of example with reference to the accompanying drawing, it is to be noted that various changes and modifications will be apparent to those skilled in the art. Therefore, unless otherwise such changes and modifications depart from the scope of the present invention, they should be construed as included therein.

What is claimed is:

1. A process for vulcanization of elastomer products which comprises the steps of heating under pressure, the elastomer product mounted in a metal mold by supplying thereto vulcanizing medium, suspending the supply of said vulcanizing medium when said elastomer product has reached a predetermined temperature or passed through a predetermined time period, subsequently supplying inert gas preliminarily extracted from atmospheric air with use of molecular sieves, and maintained at least under approximately the same pressure as that of said vulcanizing medium as a heat retaining medium, up to the termination of remaining time period for the heating step so as to maintain the elastomer product at said predetermined temperature, and, upon termination of said heating step, restoring a mixture of the inert gas and the vulcanizing medium so as to derive the inert gas through steam separation for re-utilization of said inert gas for a preshaping of the elastomer product prior to the vulcanization of said elastomer product and the like.

2. A process for vulcanization as claimed in claim 1, wherein said vulcanizing medium and inert gas are arranged to be supplied into the elastomer product through an expandable bag-like member.

3. A process for vulcanization as claimed in claim 1 or 2, wherein said molecular sieves are made of carbon.

4. A process for vulcanization as claimed in claim 1 or 2, wherein said inert gas has oxygen concentration therein, of less than approximately 1000 ppm.

5. A process for vulcanization as claimed in claim 1 or 2, wherein said inert gas has oxygen concentration therein, of less than approximately 50 ppm.

6. A process for vulcanization as claimed in claim 1 or 2, wherein said inert gas has oxygen concentration therein, of approximately 4 to 5 ppm.

* * * * *